United States Patent
Rahman et al.

(10) Patent No.: US 7,474,029 B2
(45) Date of Patent: Jan. 6, 2009

(54) ROTOR MAGNET PLACEMENT IN INTERIOR PERMANENT MAGNET MACHINES

(75) Inventors: Khwaja M. Rahman, Torrance, CA (US); James M. Nagashima, Cerritos, CA (US)

(73) Assignee: General Motors Corporation, Detroit, MI (US)

( * ) Notice: Subject to any disclaimer, the term of this patent is extended or adjusted under 35 U.S.C. 154(b) by 249 days.

(21) Appl. No.: 10/867,402

(22) Filed: Jun. 14, 2004

(65) Prior Publication Data

US 2005/0275302 A1 Dec. 15, 2005

(51) Int. Cl.
*H02K 21/12* (2006.01)
*H02K 1/27* (2006.01)

(52) U.S. Cl. ............... 310/156.56; 310/156.57; 310/162

(58) Field of Classification Search ............ 310/156.53, 310/156.56–156.57, 261, 156.43, 156.46, 310/162
See application file for complete search history.

(56) References Cited

U.S. PATENT DOCUMENTS

| | | | | |
|---|---|---|---|---|
| 2,939,025 | A * | 5/1960 | Williford, Jr. ............... | 310/261 |
| 3,671,789 | A * | 6/1972 | Menzies ..................... | 310/163 |
| 4,358,697 | A * | 11/1982 | Liu et al. .................. | 310/156.84 |
| 4,459,502 | A * | 7/1984 | El-Antably ................. | 310/184 |
| 4,663,551 | A * | 5/1987 | Weh et al. .................. | 310/152 |
| 4,888,513 | A * | 12/1989 | Fratta ........................ | 310/216 |
| 4,924,130 | A * | 5/1990 | Fratta ........................ | 310/261 |
| 5,296,773 | A * | 3/1994 | El-Antably et al. ......... | 310/261 |
| 5,818,140 | A * | 10/1998 | Vagati ........................ | 310/185 |
| 5,903,080 | A * | 5/1999 | Nashiki et al. .............. | 310/168 |
| 5,945,760 | A * | 8/1999 | Honda et al. ............. | 310/156.53 |
| 5,962,944 | A * | 10/1999 | Narita et al. ............. | 310/156.53 |
| 6,087,751 | A * | 7/2000 | Sakai ..................... | 310/156.45 |
| 6,121,706 | A * | 9/2000 | Nashiki et al. .............. | 310/168 |
| 6,218,753 | B1 * | 4/2001 | Asano et al. ............ | 310/156.53 |
| 6,239,526 | B1 * | 5/2001 | Oh et al. ..................... | 310/162 |
| 6,259,181 | B1 * | 7/2001 | Kawano et al. ............. | 310/162 |
| 6,340,857 | B2 * | 1/2002 | Nishiyama et al. ..... | 310/156.53 |
| 6,630,762 | B2 * | 10/2003 | Naito et al. ............ | 310/156.53 |
| 6,664,688 | B2 * | 12/2003 | Naito et al. ............ | 310/156.01 |
| 6,674,205 | B2 * | 1/2004 | Biais et al. ............. | 310/156.53 |
| 6,703,746 | B2 * | 3/2004 | Biais et al. ............. | 310/156.53 |
| 6,741,003 | B2 * | 5/2004 | Naito et al. ............ | 310/156.53 |
| 6,759,778 | B2 * | 7/2004 | Nishiyama et al. ..... | 310/156.53 |
| 6,815,858 | B2 * | 11/2004 | Matsunobu et al. .... | 310/156.45 |
| 6,815,859 | B2 * | 11/2004 | Sakuma et al. ......... | 310/156.53 |
| 6,836,045 | B2 * | 12/2004 | Murakami et al. ..... | 310/156.53 |
| 6,849,983 | B2 * | 2/2005 | Tajima et al. ............... | 310/166 |
| 2002/0070620 | A1 * | 6/2002 | Naito et al. ............ | 310/156.56 |
| 2003/0052561 | A1 | 3/2003 | Rahman et al. | |
| 2003/0102755 | A1 * | 6/2003 | Naito et al. ............ | 310/156.39 |
| 2003/0173852 | A1 | 9/2003 | Biais et al. | |
| 2003/0222526 | A1 * | 12/2003 | Matsunobu et al. .... | 310/156.45 |

FOREIGN PATENT DOCUMENTS

JP 2003333778 A * 11/2003
WO WO 02/078151 A2 * 10/2002

* cited by examiner

*Primary Examiner*—Burton Mullins

(57) ABSTRACT

A machine includes a stator and a rotor having a plurality of poles. Each pole is formed at least in part by a plurality of permanent magnets recessed within the rotor at a predetermined distance from an outer surface of the rotor. The distance is predetermined to minimize rotor flux variation near the outer surface during rotation of the rotor relative to the stator. Eddy current losses are thereby reduced.

9 Claims, 4 Drawing Sheets

US 7,474,029 B2

ROTOR MAGNET PLACEMENT IN INTERIOR PERMANENT MAGNET MACHINES

FIELD OF THE INVENTION

The present invention relates generally to interior permanent magnet machines and, more particularly to placement of magnets in a rotor of an interior permanent magnet machine.

BACKGROUND OF THE INVENTION

Interior permanent magnet (IPM) machines have a number of operating characteristics that make them attractive for use in vehicle propulsion applications. Compared, for example, to AC induction and DC motors, IPM motors can provide high efficiency, high torque and high power densities. IPM machines also have a long constant power operating range. An IPM machine typically includes a stator with multiphase windings. A rotor having interior permanent magnets is separated from the stator by an air gap. A magnetic field, produced by the flow of current through the stator windings, interacts with a magnetic field produced by the rotor magnets, thereby causing the rotor to rotate.

Permanent magnets have low permeability and therefore exhibit high reluctance directly along a magnetic axis (d-axis) inside an IPM machine rotor. Along a q-axis, between the magnetic poles or magnet barriers of an IPM rotor, there exists no magnetic barrier, and so magnetic reluctance is very low. This variation of reluctance around a rotor provides saliency in the rotor structure of an IPM machine. This saliency causes the rotor to tend to align with a rotating magnetic field induced by the stator. Thus an IPM rotor exhibits reluctance torque in addition to permanent magnet torque generated by magnets inside the rotor. Reluctance in a d-axis can be produced by one magnet per pole, for example, as utilized in single-barrier rotor designs. Reluctance in d-axis can also be produced with multiple barriers, where magnets are placed in one or more barriers.

Due to slotting effects between rotor and stator, the rotor of an interior permanent magnet (IPM) machine is subject to flux variation in the vicinity of the air gap as the rotor spins. Flux variation causes eddy currents to be induced in the rotor and the magnets, especially near the surface of the rotor, and can result in rotor losses and magnet heating. For high-frequency operation, for example, in many automotive variable speed drive applications, eddy current losses can make the magnet vulnerable to demagnetization. To prevent demagnetization, a common industry practice is to break the magnet into smaller segments along the axial length of the machine, thus increasing the resistance to eddy currents. This process, however, can make the rotor manufacturing more complicated where a large number of magnet segments are required to be inserted into the rotor.

SUMMARY OF THE INVENTION

The present invention, in one embodiment, is directed to a machine that includes a stator and a rotor having a plurality of poles. Each pole is formed at least in part by a plurality of permanent magnets recessed within the rotor at a predetermined distance from an outer surface of the rotor. The distance is predetermined to minimize rotor flux variation near the outer surface during rotation of the rotor relative to the stator.

In another embodiment, a machine includes a stator and a rotor separated from the stator by an air gap and having a plurality of slots and a plurality of permanent magnets located in at least several of the slots to form a rotor pole. Each magnet is recessed within the rotor so as to minimize rotor flux variation inside the magnet during rotation of the rotor relative to the stator.

An embodiment of a method of constructing a rotor for an IPM machine includes determining a distance from a surface of the rotor at which to place a magnet within the rotor so as to limit rotor flux variation inside the magnet during rotation of the rotor relative to a stator. A plurality of slots are provided within the rotor at the determined distance, and a plurality of magnets are placed in at least several of the slots.

In another embodiment, a machine includes a stator and a rotor that rotates relative to the stator and having a plurality of slots recessed within the rotor. A plurality of sintered permanent magnets are located in at least several of the slots to form a rotor pole. Slots not occupied by the magnets are empty.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

The following description of various embodiments of the present invention is merely exemplary in nature and is in no way intended to limit the invention, its application, or uses.

As further described below, in multi-barrier designs for IPM machines, rotor magnets are provided in layers. Multi-barrier rotor designs can reduce leakage and increase rotor saliency and offer a number of advantages over single-barrier designs. Multi-barrier rotors are described in U.S. patent application Ser. No. 09/952,319 filed Sep. 14, 2001, U.S. Pat. No. 6,674,205, issued Jan. 6, 2004, and U.S. patent application Ser. No. 10/431,744, filed May 8, 2003, the disclosures of which are incorporated herein by reference in their entirety. The foregoing applications are assigned to the assignee of the present application.

Figure 1:
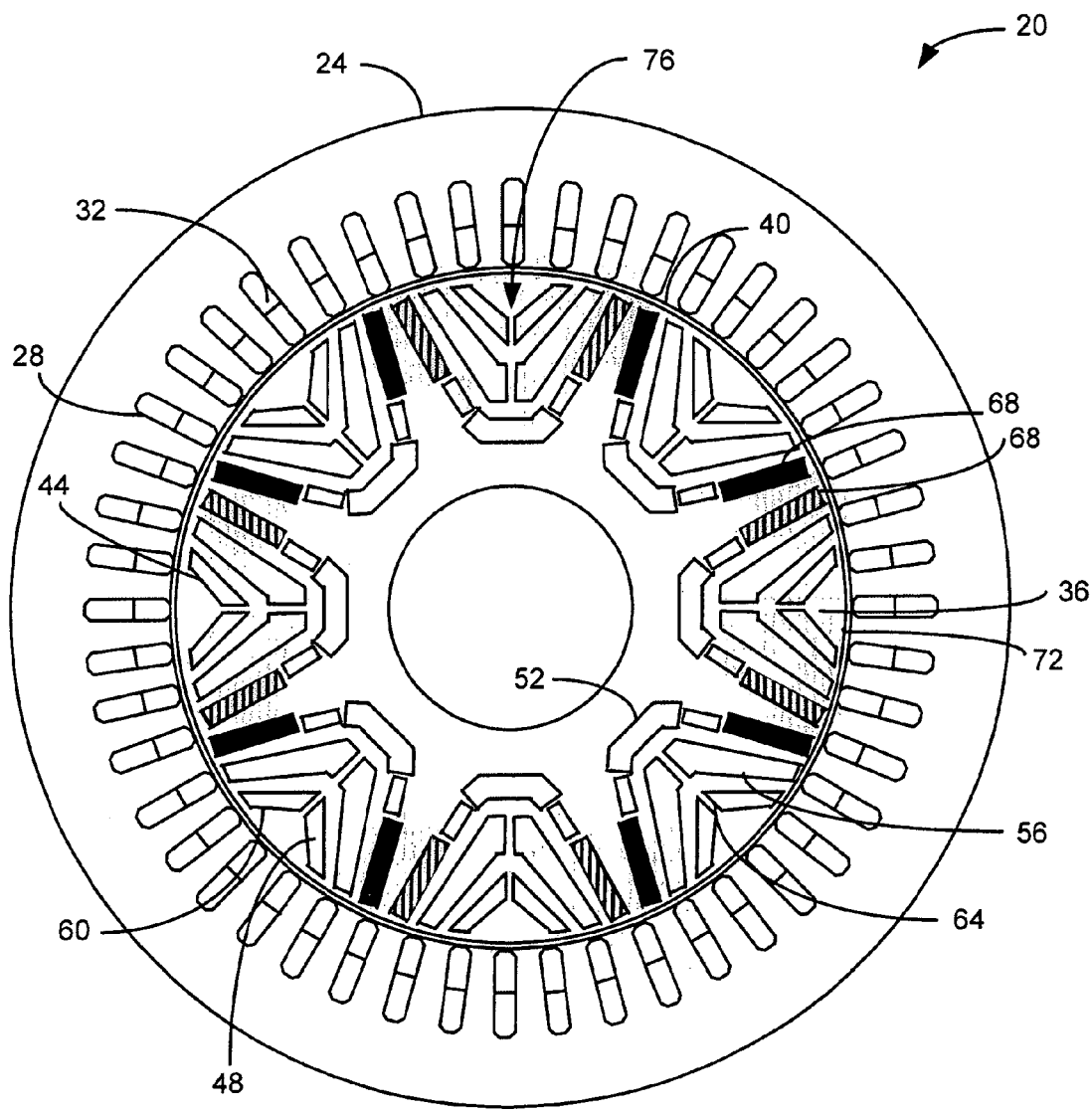
FIG. 1 is a cross-sectional view of an IPM synchronous machine according to a first embodiment of the present invention.

A cross-sectional view of a first embodiment of a multi-barrier synchronous IPM machine is indicated generally in FIG. 1 by reference number 20. The machine 20 includes a stator 24 having a plurality of slots 28 through which multiphase windings 32 are wound. In the embodiment shown in FIG. 1, the stator 24 has forty-eight slots 28. A rotor 36 is separated from the stator 24 by an air gap 40. A plurality of slots 44 in the rotor 36 form a plurality of barriers 48, for example, inner barriers 52, middle barriers 56 and outer barriers 60. The slots 44 in a barrier 48 may be separated by bridges 64.

A plurality of sintered permanent magnets 68 are located in slots 44 of the inner barriers 52 near an outer surface 72 of the rotor 36. The rotor 36 includes a plurality of magnetic poles, one of which is indicated generally by reference number 76. Each pole 76 is formed at least in part by the magnets 68 in the slots 44. In the embodiment shown in FIG. 1, the rotor 36 has eight poles 76.

The aforementioned U.S. patent application Ser. Nos. 09/952,319 and 10/431,744, and U.S. Pat. No. 6,674,205 describe rotors including injection-molded magnets located in rotor barriers. In machines utilizing such rotors, magnetic flux can be maintained such that back EMF (electromotive force) at maximum speed(s) is kept below a predetermined limit. In the embodiment shown in FIG. 1, the sintered magnets 68 have a high magnetic energy product (MEP) compared, for example, to the injection-molded magnets described in U.S. patent application Ser. Nos. 09/952,319 and 10/431,744, and U.S. Pat. No. 6,674,205. Accordingly, slots 44 of the rotor middle and outer barriers 56 and 60 can be left empty, e.g., air-filled. Slots 44 of the inner barriers 52 which are not occupied by the magnets 68 also can be left empty. Any or all empty slots 44 may be filled with a non-magnetic material, for example, epoxy, that exhibits thermal behavior conducive to improving thermal performance of the rotor 36. In some embodiments in which one or more slots 44 are filled with such material, one or more bridges 64 between slots can be eliminated. When the magnets 68 are placed in slots 44, the rotor 36 can be magnetized, for example, as described in the foregoing U.S. Patent applications.

In the embodiment shown in FIG. 1, slotting of the stator 24 and rotor 36 causes variation of rotor flux near the air gap 40 as the rotor 36 spins. Such variation typically has a frequency higher than a fundamental frequency of the stator 24. For example, in the machine 20, frequency of the flux variation is twelve times the fundamental frequency of the stator 24 and forty-eight times the mechanical rotational frequency. Flux variation amplitude typically is highest near the rotor surface 72 and gradually decreases with distance from the surface 72. A high frequency of flux variation could result in significant eddy currents, particularly where low-resistivity sintered magnets are used in the rotor 36.

Figure 2:
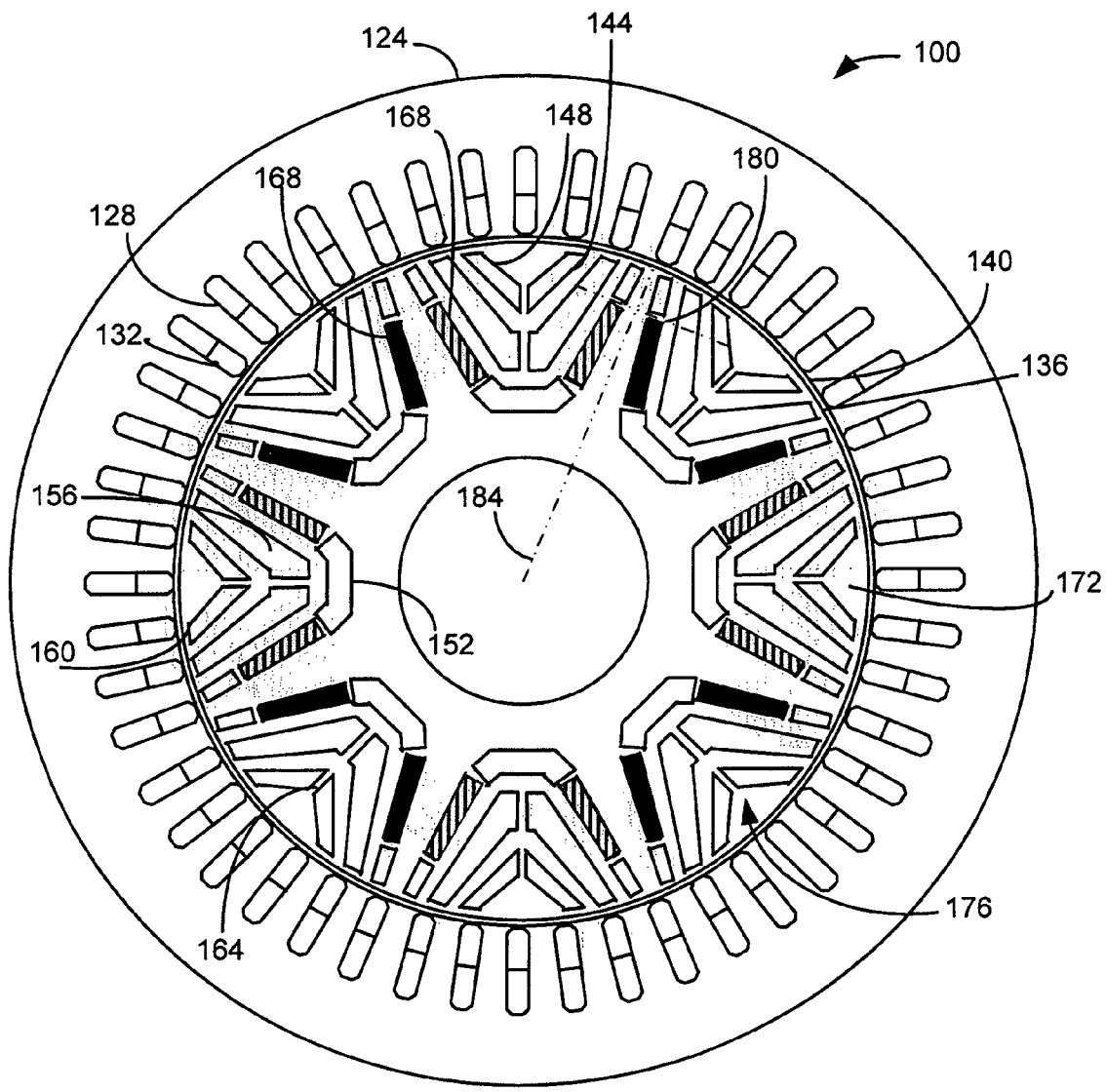
FIG. 2 is a cross-sectional view of an IPM synchronous machine according to a second embodiment of the present invention.

A cross-sectional view of a multi-barrier IPM machine according to a second embodiment is indicated generally in FIG. 2 by reference number 100. The machine 100 includes a stator 124 having a plurality of slots 128 through which multiphase windings 132 are wound. In the embodiment shown in FIG. 2, the stator 124 has forty-eight slots 128. A rotor 136 is separated from the stator 124 by an air gap 140. A plurality of slots 144 in the rotor 136 form a plurality of barriers 148, for example, inner barriers 152, middle barriers 156 and outer barriers 160. The slots 144 in each barrier 148 may be separated by bridges 164.

A plurality of sintered permanent magnets 168 are located in slots 144 of the inner barriers 152. The rotor 136 includes a plurality of magnetic poles, one of which is indicated generally by reference number 172. Each pole 172 is formed at least in part by the magnets 168 in the slots 144. In the embodiment shown in FIG. 2, the rotor 136 has eight poles 172.

The magnets 168 are recessed from an outer surface 176 of the rotor 136 by a predetermined distance 180. The distance 180 is determined based on rotor size and is calculated to minimize flux variation of the rotor 136 inside the rotor magnet 168 during rotation of the rotor relative to the stator 124. In the present embodiment, the distance is about one-tenth of a radius 184 of the rotor 136. Thus, for example, where the rotor 136 has a radius of about fifty millimeters, the distance 180 of the magnets 168 from the rotor outer surface 176 is about five millimeters. Since flux variation decreases with distance from the surface 176, it should be clear that the distance 180 is a minimum distance useful for limiting flux variation in accordance with principles of the present invention.

As previously discussed with reference to FIG. 1, slots 144 of the middle and outer barriers 156 and 160 can be left empty, e.g., air-filled. Slots 144 of the inner barriers 152 which are not occupied by the magnets 168 also can be left empty. Any or all empty slots 144 may be filled with a non-magnetic material, for example, epoxy, that exhibits thermal behavior conducive to improving thermal performance of the rotor 136. In some embodiments in which one or more slots 144 are filled with such material, one or more bridges 164 between slots can be eliminated. When the magnets 168 are placed in slots 144, the rotor 136 can be magnetized, for example, as described in the foregoing U.S. Patent applications.

Figure 3:
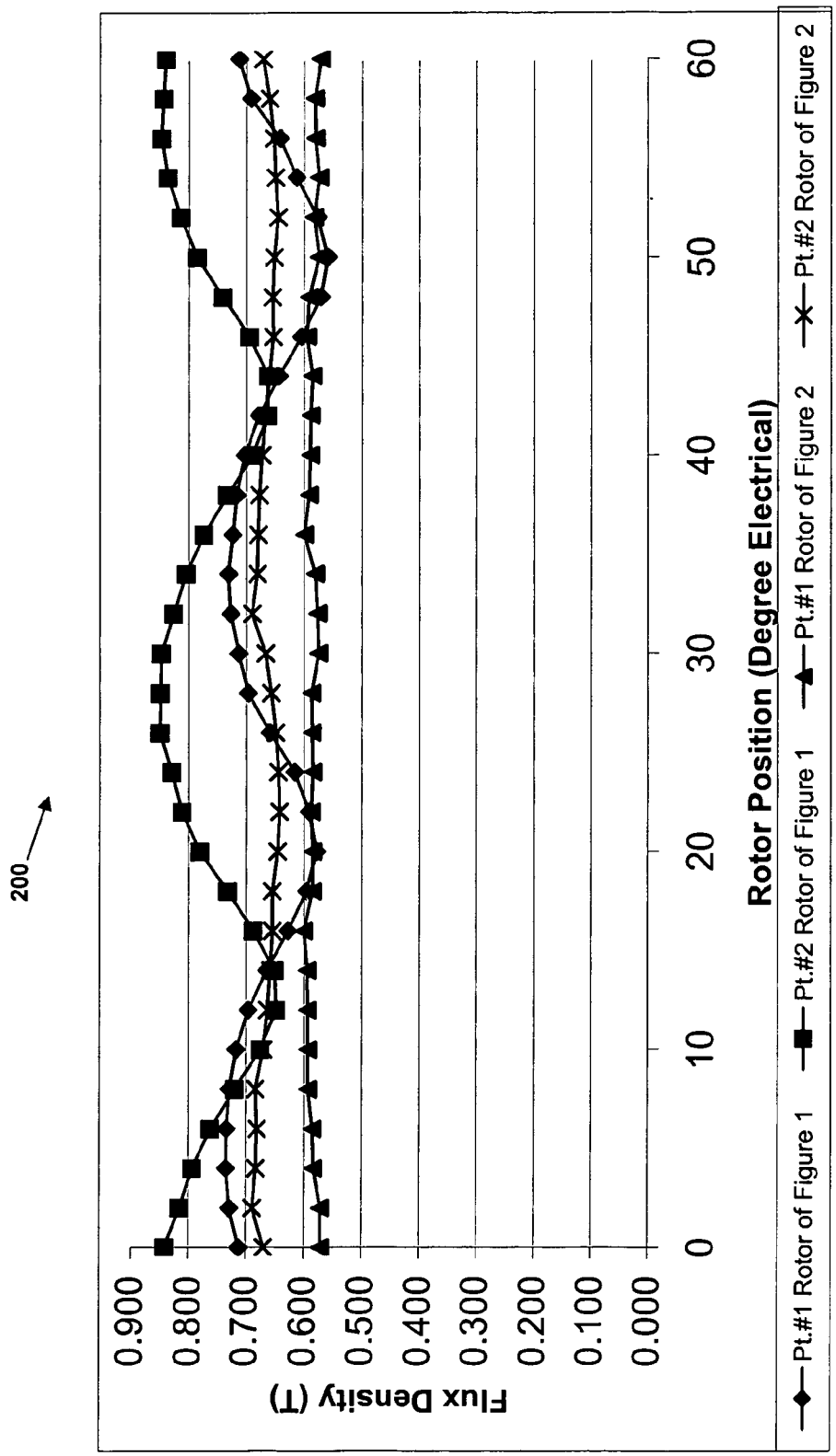
FIG. 3 is a graph comparing flux variation inside the rotor magnets shown in FIGS. 1 and 2.

Compared to the machine 20, the machine 100 exhibits lower flux variation inside the rotor magnet and therefore lower eddy current losses. For example, a graph comparing flux variation inside magnets of rotors 36 and 136 is indicated generally in FIG. 3 by reference number 200. Flux variation is shown in FIG. 3 for two points inside the magnets at which flux variation tends to be highest for the rotors 36 and 136.

Figure 4:
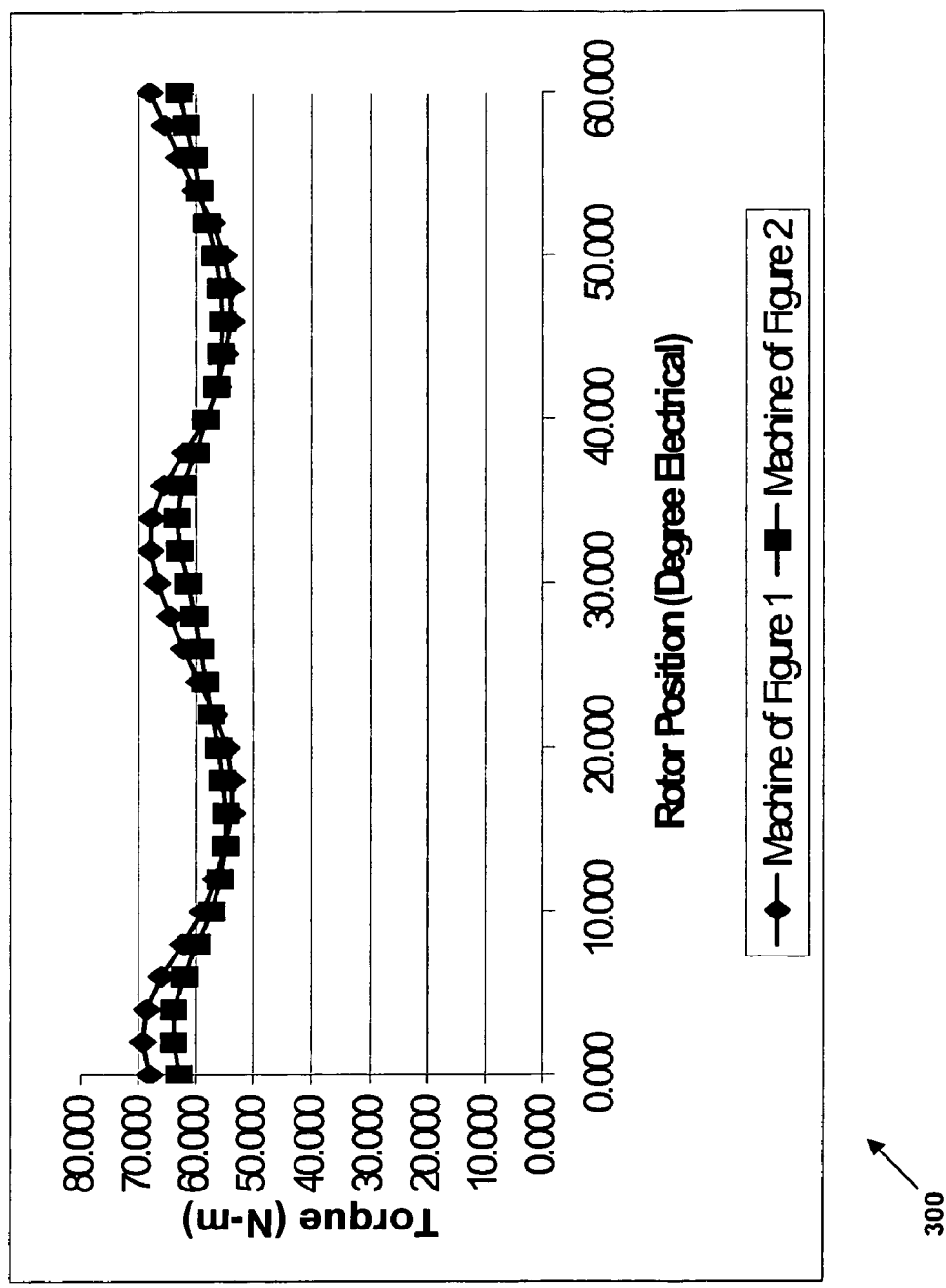
FIG. 4 is a graph comparing torque produced by the machines shown in FIGS. 1 and 2.

A graph comparing peak torque capability of the machines 20 and 100 is indicated generally in FIG. 4 by reference number 300. For the same current and control angles, the machines 20 and 100 produce the same or similar amounts of average torque. It also can be seen that the machine 100 exhibits lower peak-to-peak torque ripple than the machine 20. Because a rotor magnet 168 of the machine 100 has a shorter moment arm than a rotor magnet 68 of the machine 20, rotor mechanical stress tends to be less for the machine 100 than for the machine 20.

Because sintered magnets are used in the foregoing embodiments, it is possible to use less magnetic material than is used in rotors of the prior art and to leave unused barrier slots empty. In embodiments wherein rotor magnets are recessed within the rotor as described above, eddy current losses in the magnet can be minimized, since magnets are located inside the rotor where the flux variation is low. Thus eddy-induced losses can be minimized without compromising machine performance or complicating the rotor manufacturing. Rotor manufacturing is easier because rotor magnetization can be performed after the magnets are placed inside the rotor. Torque ripple and rotor stress due to centrifugal force also are reduced.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. An electric machine, comprising:
   a stator; and
   a rotor comprising a plurality of poles each including:
      a first plurality of slots that define a U-shape that is bisected by a radial line of said rotor,
      wherein said first plurality of slots includes first and second radially-outer barrier slots that are oblique to said radial line, first and second middle slots that are oblique to said radial line, and a radially inner barrier slot that is normal to said radial line of said rotor, wherein said first and second middle slots include first and second permanent magnets, respectively; and a second plurality of slots defining a U-shape that is bisected by said radial line of said rotor and that is arranged between said first and second radially-outer barrier slots and radially outside of said radially inner barrier slot.

2. The electric machine of claim 1 wherein said second plurality of slots comprise barrier slots.

3. The machine of claim 1 wherein said first and second middle slots are located a predetermined distance from an outer surface of said rotor, and wherein said distance comprises a distance greater than or equal to one-tenth of a radius of said rotor.

4. The machine of claim 1 wherein said magnets comprise one or more sintered magnets.

5. The machine of claim 1 wherein said rotor has a radius having a length of about fifty millimeters and said distance comprises about five millimeters.

6. The machine of claim 1 wherein for each said pole, said first and second permanent magnets are located in only said first and second middle slots.

7. The machine of claim 1 wherein said first and second radially-outer barrier slots and said radially inner barrier slot are air-filled.

8. The machine of claim 1 wherein one of said first and second plurality of slots is at least partially filled with a non-magnetic material.

9. The machine of claim 8 wherein said non-magnetic material is epoxy.

\* \* \* \* \*